United States Patent
Oroskar

(10) Patent No.: US 9,088,972 B1
(45) Date of Patent: *Jul. 21, 2015

(54) SELECTION OF WIRELESS COVERAGE AREAS AND MEDIA CODECS

(71) Applicant: Sprint Spectrum L.P., Overland Park, KS (US)

(72) Inventor: Siddharth S. Oroskar, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/724,009

(22) Filed: Dec. 21, 2012

(51) Int. Cl.
*H04W 72/00* (2009.01)
*H04W 72/04* (2009.01)

(52) U.S. Cl.
CPC ..................................... *H04W 72/04* (2013.01)

(58) Field of Classification Search
USPC .......... 455/450, 525, 524, 436–445; 370/331, 370/332
See application file for complete search history.

(56) References Cited

U.S. PATENT DOCUMENTS

| | | | |
|---|---|---|---|
| 5,778,319 | A | 7/1998 | Sawaki |
| 5,978,463 | A | 11/1999 | Jurkevics et al. |
| 6,185,421 | B1 | 2/2001 | Alperovich et al. |
| 6,216,004 | B1 | 4/2001 | Tiedemann, Jr. et al. |
| 6,223,042 | B1 | 4/2001 | Raffel |
| 6,289,227 | B1 | 9/2001 | Shi |
| 6,295,451 | B1 | 9/2001 | Mimura |
| 6,798,786 | B1 | 9/2004 | Lo et al. |
| 6,963,750 | B1 | 11/2005 | Cheng et al. |
| 7,317,706 | B1 | 1/2008 | Hao et al. |
| 7,693,526 | B2 | 4/2010 | Qian et al. |
| 7,768,998 | B1 | 8/2010 | Everson et al. |
| 7,873,074 | B1 | 1/2011 | Boland |
| 8,107,435 | B1 | 1/2012 | Singh et al. |
| 8,160,024 | B1 | 4/2012 | Ghaus et al. |
| 8,160,611 | B1 | 4/2012 | Oroskar |
| 8,254,930 | B1 | 8/2012 | Mauer et al. |
| 8,265,039 | B2 | 9/2012 | Reza et al. |
| 8,270,979 | B1 | 9/2012 | Vargantwar |
| 2001/0034233 | A1 | 10/2001 | Tiedemann, Jr. et al. |

(Continued)

FOREIGN PATENT DOCUMENTS

| | | |
|---|---|---|
| WO | 01/47287 | 6/2001 |
| WO | 2011/053222 | 5/2011 |

OTHER PUBLICATIONS

First Action Interview Pilot Program Pre-Interview Communication mailed Sep. 26, 2013 (29 pages).

(Continued)

*Primary Examiner* — Patrick Edouard
*Assistant Examiner* — Said Elnoubi

(57) ABSTRACT

A request to establish a call involving a wireless communication device WCD served by a radio access network (RAN) may be received. The WCD may receive signals from the RAN via a plurality of wireless coverage areas at respective signal strengths. The plurality of wireless coverage areas may be defined by the RAN. A media codec to use for the call may be determined. Based on the media codec, a set of n wireless coverage areas through which the WCD and the RAN communicate during the call may be selected. The value of n may be between 1 and a predetermined maximum number, and the set of n wireless coverage areas may be selected from the plurality of wireless coverage areas.

20 Claims, 9 Drawing Sheets

(56) References Cited

U.S. PATENT DOCUMENTS

| | | | |
|---|---|---|---|
| 2001/0046879 A1 | 11/2001 | Schramm et al. | |
| 2003/0063569 A1* | 4/2003 | Kalliokulju et al. | 370/252 |
| 2003/0189950 A1 | 10/2003 | Spear et al. | |
| 2004/0002340 A1 | 1/2004 | Lim et al. | |
| 2004/0008627 A1 | 1/2004 | Garg et al. | |
| 2004/0029533 A1* | 2/2004 | Matsuo et al. | 455/63.1 |
| 2004/0165563 A1 | 8/2004 | Hsu et al. | |
| 2004/0203802 A1* | 10/2004 | McCormick et al. | 455/445 |
| 2004/0224719 A1 | 11/2004 | Nounin et al. | |
| 2004/0235471 A1* | 11/2004 | Madsen | 455/434 |
| 2004/0252669 A1 | 12/2004 | Hosein | |
| 2005/0003827 A1 | 1/2005 | Whelan | |
| 2005/0164718 A1 | 7/2005 | Rajkotia et al. | |
| 2005/0261899 A1 | 11/2005 | Brueck et al. | |
| 2005/0288018 A1 | 12/2005 | Huang et al. | |
| 2006/0023648 A1 | 2/2006 | Amos | |
| 2006/0174015 A1 | 8/2006 | Arauz-Rosado | |
| 2007/0043558 A1 | 2/2007 | Schwarz et al. | |
| 2007/0047707 A1 | 3/2007 | Mayer et al. | |
| 2007/0232330 A1 | 10/2007 | Ranganathan | |
| 2008/0028695 A1 | 2/2008 | Fennell | |
| 2009/0061854 A1 | 3/2009 | Gillot et al. | |
| 2009/0209300 A1 | 8/2009 | Furbeck | |
| 2009/0227277 A1 | 9/2009 | Gupta et al. | |
| 2009/0247137 A1 | 10/2009 | Awad | |
| 2009/0303983 A1 | 12/2009 | Kennedy | |
| 2009/0322582 A1 | 12/2009 | Baugh et al. | |
| 2010/0008295 A1 | 1/2010 | Ji et al. | |
| 2010/0142477 A1 | 6/2010 | Yokota | |
| 2011/0122786 A1 | 5/2011 | Koo et al. | |
| 2011/0151877 A1* | 6/2011 | Tafreshi | 455/442 |
| 2011/0244868 A1* | 10/2011 | Senarath et al. | 455/442 |
| 2011/0300866 A1* | 12/2011 | Ali et al. | 455/436 |
| 2012/0178462 A1* | 7/2012 | Kim | 455/450 |
| 2013/0173259 A1 | 7/2013 | Mittal et al. | |
| 2013/0308470 A1 | 11/2013 | Bevan et al. | |

OTHER PUBLICATIONS

Office Action for U.S. Appl. No. 13/483,933 mailed Oct. 7, 2013 (25 pages).

"Enhanced Variable Rate Codec, Speech Service Options 3, 68, 70, and 73 for Wideband Spread Spectrum Digital Systems," 3GPP2 C.S0014-D, Version 1, pp. 1-1 through 9-24 (May 2009).

CouthIT, "EVRC-A," 1 page, May 18, 2012 (www.couthit.com/codec-evrc.asp).

CouthIT, "EVRC-B," 1 page, May 18, 2012 (www.couthit.com/codec-evrc-b.asp).

CouthIT, "EVRC-NW," 2 pages, May 18, 2012 (www.couthit.com/codec-evrc-nw.asp).

CouthIT, "EVRC-C, EVRC-WB," 2 pages, May 18, 2012 (www.couthit.com/codec-evrc-wb.asp).

Desineni et al., "RTP Payload Format for the Enhanced Variable Rate Wideband Codec (EVRC-WB) and the Media Subtype Updates for EVRC-B Codec," Network Working Group, pp. 1-25 (Feb. 2008).

Office Action for U.S. Appl. No. 13/598,042 mailed Oct. 25, 2012 (35 pages).

Notice of Allowance for U.S. Appl. No. 13/011,028 mailed Dec. 7, 2012 (15 pages).

TIA Standard, "Interoperability Test Specification for cdma2000® Air Interface," TIA-1036, Section 3.11, Jan. 2005.

TR45, "Inter-Operability Specification (IOS) for CDMA 2000 Access Network Interfaces," TIA/EIA/IS-2001-A, Sections 2.2.2.2, 3.4.1, 3.4.3.1.11, and 3.4.9, Jun. 2001.

First Action Interview Pilot Program Pre-Interview Communication for U.S. Appl. No. 13/724,053 mailed Jul. 9, 2014, 17 pages.

* cited by examiner

SELECTION OF WIRELESS COVERAGE AREAS AND MEDIA CODECS

BACKGROUND

Wireless service providers typically design their wireless networks to comprise a number of partially-overlapping wireless coverage areas. Each wireless coverage area may support one or more types of media codecs (e.g., voice, music, still image, and/or video codecs). As new, higher-quality and/or more efficient media codecs are deployed, wireless service providers may upgrade their base transceiver stations (BTSs) and/or its base station controllers (BSCs) to support these new media codecs.

OVERVIEW

During a call, a wireless communication device (WCD) may communicate substantially simultaneously via a number of wireless coverage areas. For instance, the WCD may receive the same information in two or more messages via two or more different wireless coverage areas at approximately the same time. This substantially simultaneous communication may improve the reliability of communication involving the WCD.

However, if the WCD is using a particular media codec to communicate, this substantially simultaneous communication may not be effective unless most or all of the wireless coverage areas used by the WCD can support one or more features of the particular media codec. For example, if the WCD is communicating using a high-bitrate codec operating at a particular target bitrate, it may be advantageous to limit the extent of wireless coverage areas that are used for substantially simultaneous communication to those capable of supporting the high-bitrate codec and/or the target bitrate.

Conversely, if the WCD is assigned a set of n wireless coverage areas for substantially simultaneous communication, it may be advantageous to select a media codec and/or a target bitrate for the codec based on the capacity of the n wireless coverage areas. For instance, if the WCD receives signals from at least of the n wireless coverage areas at signal strengths below a threshold value, assigning the WCD a media codec that operates at a lower bitrate (or operating an assigned media codec at a lower target bitrate) may provide a better overall user experience than assigning a media code operating at a higher target bitrate.

Accordingly, in a first example embodiment, a request to establish a call involving a wireless communication device WCD served by a radio access network (RAN) may be received. The WCD may receive signals from the RAN via a plurality of wireless coverage areas at respective signal strengths. The plurality of wireless coverage areas may be defined by the RAN. A media codec to use for the call may be determined. Based on the media codec, a set of n wireless coverage areas through which the WCD and the RAN communicate during the call may be selected. The value of n may be between 1 and a predetermined maximum number, and the set of n wireless coverage areas may be selected from the plurality of wireless coverage areas.

In a second example embodiment, a request to establish a call involving a WCD served by a RAN may be received. The WCD may receive signals from the RAN via a plurality of wireless coverage areas at respective signal strengths. The plurality of wireless coverage areas may be defined by the RAN. Based on the respective signal strengths, a set of n wireless coverage areas may be selected from the plurality of wireless coverage areas to support communications related to the call between the WCD and the RAN. The value of n may be at least 2. A service option to use for the call may be determined, where the service option indicates a call type. At least one wireless coverage area may be removed from the set of n wireless coverage areas based on the indicated call type.

In a third example embodiment, a request to establish a call involving a WCD served by a RAN may be received. The WCD may receive signals from the RAN via a plurality of wireless coverage areas at respective signal strengths. The plurality of wireless coverage areas may be defined by the RAN. A media codec to use for the call and a target bitrate for the media codec to use during the call may be determined. Based on the target bitrate, a set of n wireless coverage areas through which the WCD and the RAN communicate during the call may be selected. The value of n may be between one and a predetermined maximum number. The set of n wireless coverage areas may be selected from the plurality of wireless coverage areas.

In a fourth example embodiment, a request to establish a call involving a WCD served by a RAN may be received. The WCD may receive signals from the RAN via a plurality of wireless coverage areas at respective signal strengths. The plurality of wireless coverage areas may be defined by the RAN. Based on the respective signal strengths, a set of n wireless coverage areas may be selected from the plurality of wireless coverage areas to support communications related to the call between the WCD and the RAN. The value of n may be at least 2. A media codec to use for the call and a target bitrate for the media codec to use during the call may be determined. At least one wireless coverage area may be removed from the set of n wireless coverage areas based on the target bitrate.

A fifth example embodiment may include a non-transitory computer-readable storage medium, having stored thereon program instructions that, upon execution by a computing device, cause the computing device to perform operations in accordance with the first, second, third, and/or fourth example embodiments.

A sixth example embodiment may include a RAN device, comprising at least a processor and data storage. The data storage may contain program instructions that, upon execution by the processor, cause the RAN device to operate in accordance with the first, second, third, and/or fourth example embodiments.

These and other aspects and advantages will become apparent to those of ordinary skill in the art by reading the following detailed description, with reference where appropriate to the accompanying drawings. Further, it should be understood that this overview and other description throughout this document is merely for purposes of example and is not intended to limit the scope of the invention as claimed.

DESCRIPTION

I. Network Architecture

Figure 1:
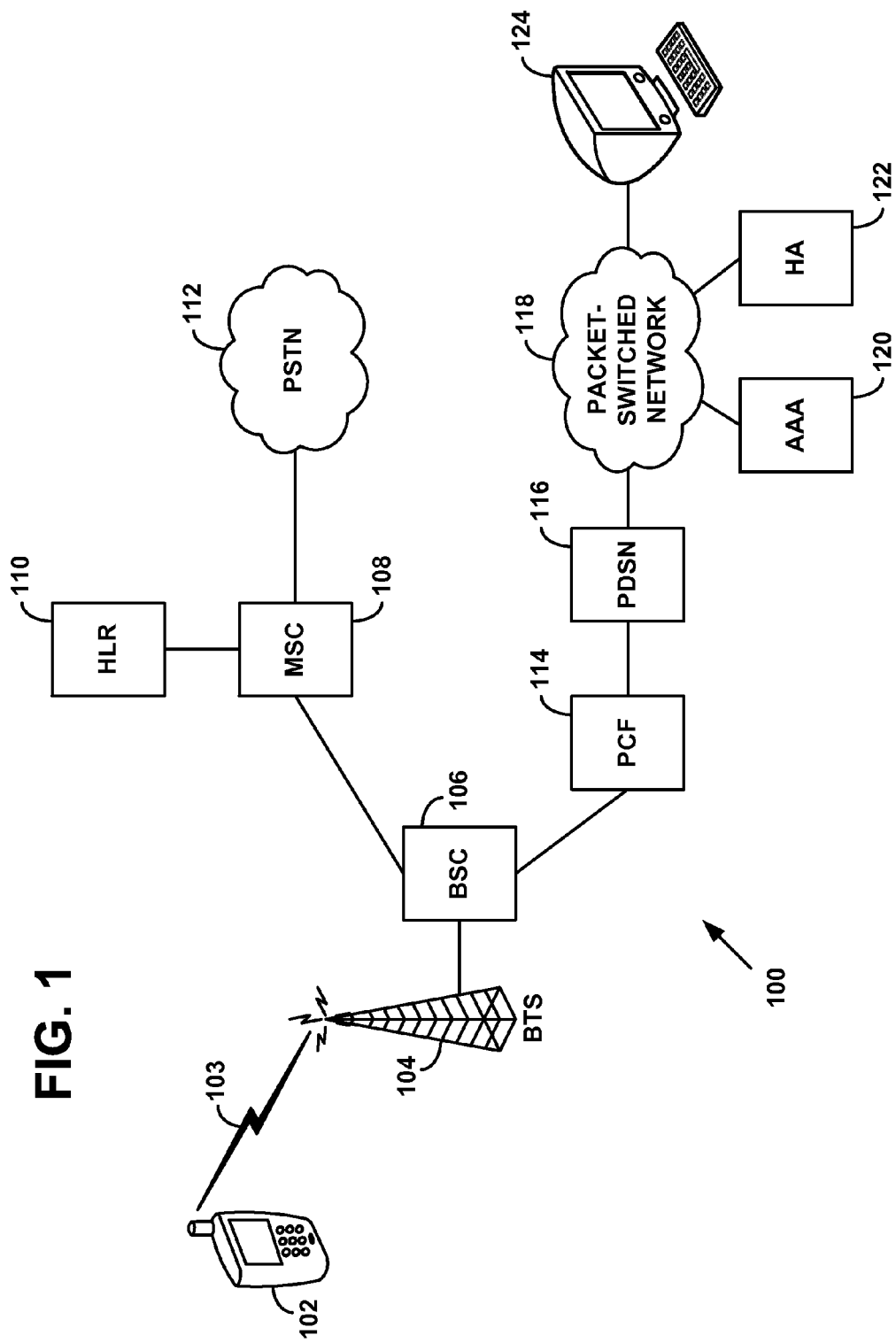
FIG. 1 depicts a RAN, in accordance with an example embodiment.

FIG. 1 shows a simplified block diagram of a wireless communication system 100 in which example embodiments can be employed. WCD 102 may communicate over an air interface 103 with a base transceiver station (BTS) 104, which is, in turn, coupled to or integrated with a base station controller (BSC) 106. Transmissions over air interface 103 from BTS 104 to WCD 102 may represent a "forward link" to the WCD. Conversely, transmissions over air interface 103 from WCD 102 to BTS 104 may represent a "reverse link" from the WCD.

BSC 106 may be connected to a mobile switching center (MSC) 108. BSC 106, MSC 108, or both, may act to control assignment of air interface traffic channels to WCDs, and may provide access to wireless circuit-switched services such as circuit-voice and circuit-data services. As represented by its connection to publically-switched telephone network (PSTN) 112, MSC 108 may also be coupled with one or more other MSCs or other telephony circuit switches, thereby supporting user mobility across MSC regions, as well as local and long-distance landline telephone services. A home location register (HLR) 110, which may be connected to MSC 108, may support mobility-related aspects of subscriber services, including dynamic tracking of subscriber registration location and verification of service privileges.

As shown, BSC 106 may also be connected with a packet-data serving node (PDSN) 116 by way of a packet control function (PCF) 114. PDSN 116, in turn, provides connectivity with a packet-switched network 118, such as the Internet and/or a wireless carrier's private core packet-network. Nodes on network 118 may include, by way of example, an authentication, authorization, and accounting (AAA) server 120, a mobile-IP home agent (HA) 122, and a remote computer 124. After acquiring a traffic channel over air interface 103, WCD 102 may transmit a request to PDSN 116 for a connection to the packet data network. Then, following authentication of WCD 102 by AAA server 120, WCD 102 may be assigned an IP address by the PDSN or by HA 122, and may thereafter engage in packet-data communications with entities such as remote computer 124.

In some deployments, the combination of elements including BTS 104, BSC 106, and MSC 108 may be referred to as a RAN. However, a RAN may contain more or fewer elements. For instance, some RANs may also include HLR 110, PCF 114, PDSN 116, and/or other elements not shown in FIG. 1.

Figure 2:
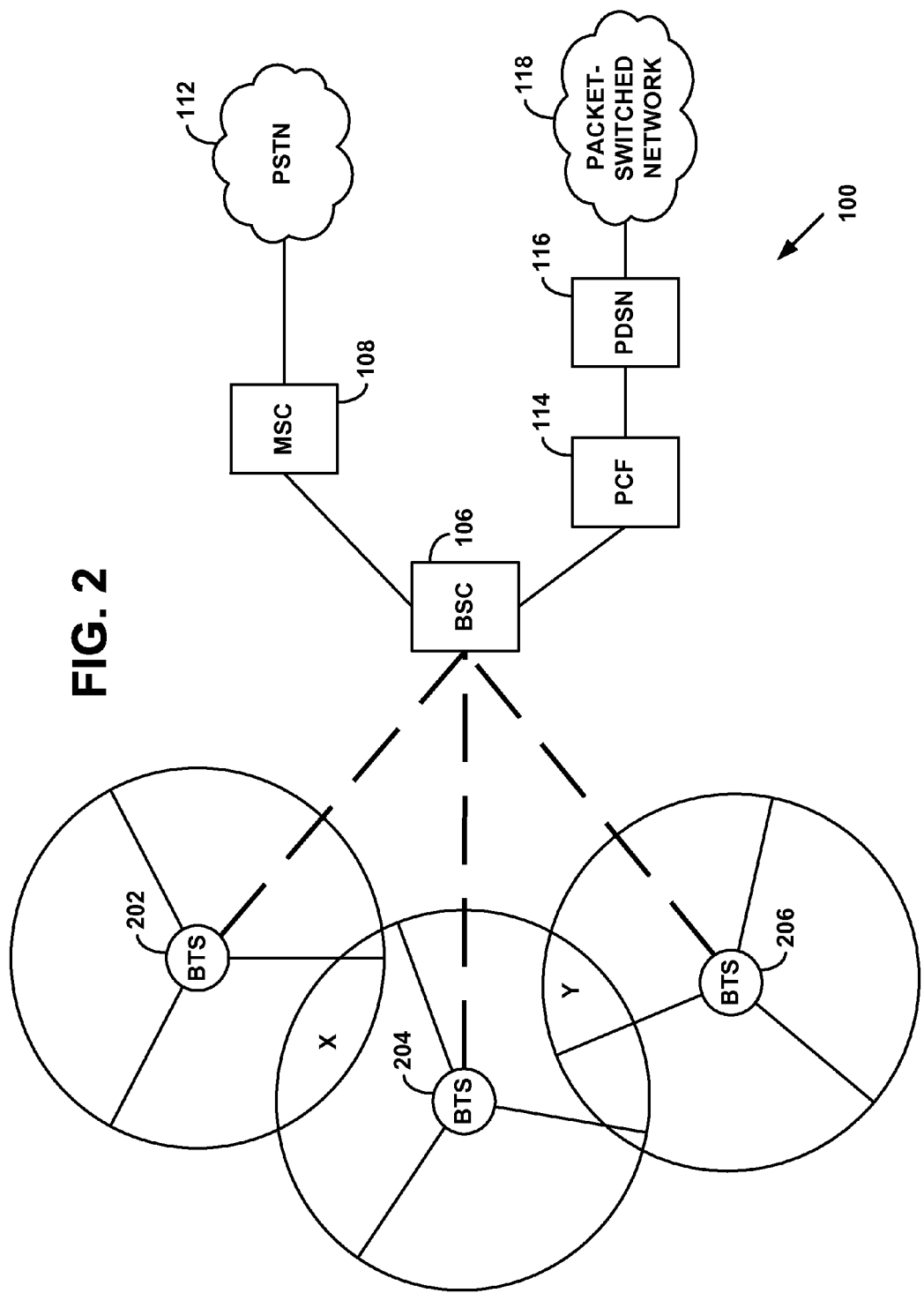
FIG. 2 depicts a RAN radiating to define several wireless coverage areas, in accordance with an example embodiment.

In practice, a BSC may serve multiple BTSs, each of which may then radiate to define a wireless coverage area. Each wireless coverage area, in turn, may comprise a plurality of wireless coverage areas. This arrangement is illustrated in FIG. 2, which shows BSC 106 in network 100 coupled with BTSs 202, 204, and 206. Each BTS is shown at the core of a respective circle representing its wireless coverage, and each BTS's wireless coverage is divided into three pie-shaped pieces representing wireless coverage areas. With this arrangement, a WCD may operate in any of the wireless coverage areas and can connect, via a serving BTS, with MSC 108 for circuit-based services and/or via PCF 114 and PDSN 116 for packet-based services. Note that the depiction of three wireless coverage areas for each of the BTSs in FIG. 2 is intended to be for purposes of example, and other numbers of wireless coverage areas per BTS are possible. Further, the relative positions of the BTSs and the relative angular orientations of the wireless coverage areas are also illustrative, and other arrangements may be used. Moreover, wireless coverage areas need not be circular, and may take on other shapes and arrangements instead.

A WCD may receive the same bearer data simultaneously from more than one wireless coverage area. To illustrate that point, FIG. 2 includes points X and Y. While in the vicinity of point X, a WCD may be able to receive signals from wireless coverage areas of BTS 202 and BTS 204. Similarly, while in the vicinity of point Y, a WCD may be able to receive signals from wireless coverage areas of BTS 204 and BTS 206. It should be noted that, in practice, a WCD located at or near points X or Y may be able to receive signals (and therefore simultaneously receive the same bearer data) from more than two wireless coverage areas.

In general, the depictions of both FIGS. 1 and 2 are illustrative. Therefore, in a RAN, there could be more or fewer of each element than is shown, and some elements may be omitted altogether. Additionally, other types of elements not shown may be present. Further, any of these elements may be combined with one another, physically or logically, or distributed across multiple physical devices. Thus, the particular arrangement shown in FIG. 1 should not be viewed as limiting with respect to the present invention. For instance, BSC 106 may be replaced by one or more radio network controllers (RNCs), and MSC 108 may be replaced, in whole or in part, by one or more softswitch and/or media gateway components.

Figure 3:
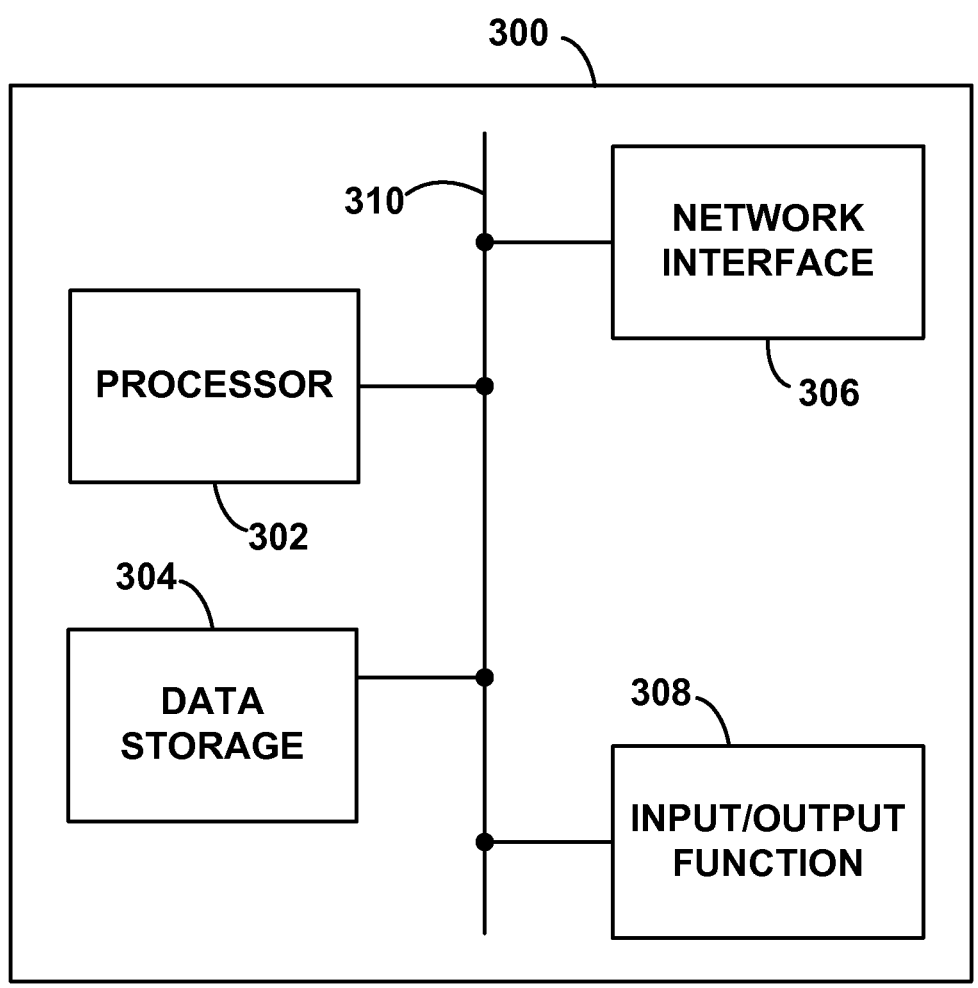
FIG. 3 is a block diagram of a RAN component, in accordance with an example embodiment.

FIG. 3 is a simplified block diagram exemplifying a RAN device 300, illustrating some of the functional components that could be included in a RAN device arranged to operate in accordance with the embodiments herein. Example RAN device 300 could be any type of device found in or associated with a RAN, such as a BTS, a BSC, or an MSC. For purposes of simplicity, this specification may equate RAN device 300 to a BSC from time to time. Nonetheless, it should be understood that the description of RAN device 300 could apply to any component used for the purposes described herein.

In this example, RAN device 300 includes a processor 302, a data storage 304, a network interface 306, and an input/output function 308, all of which may be coupled by a system bus 310 or a similar mechanism. Processor 302 can include one or more CPUs, such as one or more general purpose processors and/or one or more dedicated processors (e.g., application specific integrated circuits (ASICs) or digital signal processors (DSPs), etc.).

Data storage 304, in turn, may comprise volatile and/or non-volatile data storage and can be integrated in whole or in part with processor 302. Data storage 304 can hold program instructions, executable by processor 302, and data that may be manipulated by these instructions to carry out the various methods, processes, or functions described herein. Alternatively, these methods, processes, or functions can be defined by hardware, firmware, and/or any combination of hardware, firmware and software. By way of example, the data in data storage 304 may contain program instructions, perhaps stored on a non-transitory computer-readable medium, executable by processor 302 to carry out any of the methods, processes, or functions disclosed in this specification or the accompanying drawings.

Network interface 306 may take the form of a wireline connection, such as an Ethernet, Token Ring, or T-carrier connection. Network interface 306 may also take the form of a wireless connection, such as IEEE 802.11 (Wifi), BLUETOOTH®, or a wide-area wireless connection. However, other forms of physical layer connections and other types of standard or proprietary communication protocols may be used over network interface 306. Furthermore, network interface 306 may comprise multiple physical interfaces.

Input/output function 308 may facilitate user interaction with example RAN device 300. Input/output function 308 may comprise multiple types of input devices, such as a keyboard, a mouse, a touch screen, and so on. Similarly, input/output function 308 may comprise multiple types of output devices, such as a monitor, printer, or one or more light emitting diodes (LEDs). Additionally or alternatively, example RAN device 300 may support remote access from another device, via network interface 306 or via another interface (not shown), such an RS-232 or USB port.

II. CDMA Communications

For purposes of illustration, an example that uses Code Division Multiple Access (CDMA) communications will be described. However, it should be understood that other examples could use other protocols and/or functions now known or developed in the future.

In a CDMA wireless network, each wireless coverage area may employ one or more frequency bands, typically 1.25 MHz in bandwidth each, and each wireless coverage area may be distinguished from adjacent wireless coverage areas by a pseudo-random number offset ("PN offset"). Further, each wireless coverage area may concurrently communicate on multiple channels that are distinguished from one another by different CDMA codes (i.e., different Walsh codes). When a WCD operates in a given wireless coverage area, communications between the WCD and the BTS of the wireless coverage area may be carried on a given frequency and may also be encoded (e.g., modulated) by the wireless coverage area's PN offset and a given Walsh code.

Air interface communications in a wireless coverage area may be divided into forward link communications and reverse link communications. On the forward link, certain Walsh codes may be reserved for defining control channels, including a pilot channel, a sync channel, and one or more paging channels, and the remainder may be allocated dynamically for use as traffic channels, i.e., to carry bearer data such as email, web browsing, voice, video, and so on. Similarly, on the reverse link, one or more offsets of a CDMA code (i.e., offsets of a PN long code) may be reserved for defining control channels, such as access channels, and the remaining offsets may be allocated dynamically to WCDs for use as traffic channels.

Channel assignment to WCDs, which typically involves allocating one or more resources of a wireless coverage area to the WCDs, may occur when a new call (e.g., a voice, video, music, and/or data session) is established involving the WCD, or when the WCD hands off to a different wireless coverage area. Each of these scenarios is described below.

a. Idle Handoff and Call Establishment

Each BTS of a RAN may emit a pilot channel signal in each wireless coverage area the respective BTS defines. Based on these pilot channel signals, an idle WCD (e.g., a WCD not involved in a call) may associate with a primary wireless coverage area, and then listen to the paging channel of the primary wireless coverage area for incoming call indications, and other information, from the RAN. The RAN may transmit system parameter messages and/or neighbor list update messages to the WCD via this primary paging channel. These messages may identify PN offsets of the pilot channels emitted by BTSs that define neighboring wireless coverage areas (e.g., wireless coverage areas defined by the RAN's BTSs or wireless coverage areas defined by nearby BTSs in different RANs).

An idle WCD may measure the pilot channel signal strength that it receives from each of these neighboring wireless coverage areas. If, for some period of time, the WCD receives pilot channel signals from a neighboring wireless coverage area at a greater strength than the WCD receives pilot channel signals from the primary wireless coverage area, the WCD may hand off to the neighboring wireless coverage area. To do so, the WCD may stop listening to the primary wireless coverage area's paging channel and associate with the neighboring wireless coverage area. Accordingly, the WCD may begin listening to the neighboring wireless coverage area's paging channel, and may transmit a radio environment report message to the RAN, via the neighboring wireless coverage area's access channel, indicating the handoff. In this way, the neighboring wireless coverage area becomes the WCD's new primary wireless coverage area.

When the WCD seeks to engage in a voice or data call, the WCD may use the primary wireless coverage area's paging channel and access channel to set up the call. For example, when an idle WCD originates a new outgoing call (i.e., the WCD is the caller), the WCD may transmit one or more origination, or probe, messages to the RAN via the access channel of the primary wireless coverage area. The RAN may respond by assigning a forward-direction traffic channel to the WCD, and transmitting, via the paging channel, an indication of this assignment (e.g., a Walsh code of the assigned traffic channel). This transmission may take the form of a channel assignment message directed to the WCD. Then, the WCD may use the assigned traffic channel for receiving bearer traffic for the voice or data call.

On the other hand, when an idle WCD is the recipient of a new incoming call (i.e., the WCD is the callee), the RAN may transmit a page request message to the WCD on the paging channel of the primary wireless coverage area. In response to receiving the page request message, the WCD may transmit, to the RAN, a page response message via the primary wireless coverage area's access channel. Similar to how outgoing calls are set up, the RAN may respond by assigning a forward-direction traffic channel to the WCD, and transmitting, via the paging channel, an indication of this assignment (e.g., a Walsh code of the assigned traffic channel) to the WCD in a channel assignment message. Then, the WCD may use the assigned traffic channel for receiving bearer traffic.

The WCD may transmit bearer data to the RAN on a reverse traffic channel by applying the WCD's assigned PN long code offset to a PN long code. The WCD may then modulate the bearer data according to the resulting point in the PN long code.

b. Soft Handoff

During a call, a WCD may communicate substantially simultaneously via a number of "active" wireless coverage areas at a time. Herein, the term "substantially simultaneously" may be used to describe communications involving two or more discrete messages that pass through two or more different intermediate points at approximately the same time, such as within a few tens of milliseconds or less.

Depending on the type and/or configuration of the RAN, the number of active wireless coverage areas may be from one to six. However, more than six active wireless coverage areas may be used without departing from the scope of this invention. The WCD may maintain a list of the active wireless coverage areas, identified according to their PN offsets. This list may be referred to as the WCD's "active set."

A RAN may be arranged to transmit the same bearer data to a given WCD concurrently via some or all of the wireless coverage areas in the given WCD's active set, encoding each transmission according to the PN offset of the respective wireless coverage area and the Walsh code for the assigned channel therein. Correspondingly, the WCD may decode forward link transmissions from each wireless coverage area using the respective wireless coverage area's PN offset together with the WCD's respectively allocated Walsh code for the wireless coverage area. The concurrent transmissions in wireless coverage areas of the active set provides an added level of reliability to communications, as well as possibly increased quality owing to improved signal-to-noise characteristics. The concurrency also facilitates a form of seamless handoff between wireless coverage areas, referred to as "soft handoff" when the handoff is between wireless coverage areas of different BTSs, and "softer handoff" when the handoff is between wireless coverage areas of the same BTS. (For sake of simplicity, only the term "soft handoff" will be used in the following discussion.)

In addition to its active set, the WCD may maintain a list of "candidate" wireless coverage areas (typically up to six, but more is possible), which includes wireless coverage areas that are not in the WCD's active set but that have sufficient signal strength such that the WCD could demodulate signals from those wireless coverage areas. Further, the WCD may maintain a list of "neighbor" wireless coverage areas that are not in its active set or candidate set, but are in close vicinity to the WCD and deemed by the RAN to be wireless coverage areas that the WCD should monitor for eligibility as candidate wireless coverage areas. Other wireless coverage areas that are not in the WCD's active set, candidate set, or neighbor set may be members of a "remaining" set.

The WCD may continuously, or from time to time, measure the strength of each pilot channel signal that it receives and may notify the RAN when a received pilot strength is above or below designated thresholds. More particularly, the BTS may provide the WCD with a handoff direction message (HDM), which indicates (i) the PN offsets of the wireless coverage areas in the WCD's active set, and (ii) the following handoff parameters that relate to pilot signal strength:

T_ADD: Threshold pilot strength for addition to the active set (e.g., −14 decibels (dB))

T_COMP: Difference in signal strength from an active set pilot (e.g., 2 dB)

T_DROP: Threshold pilot strength for removal from the active set (e.g., −16 dB)

T_TDROP: Time for which an active set pilot falls below T_DROP to justify removal from the active set (e.g., 2 seconds)

The WCD may then monitor the pilot signals that it receives, measuring signal strength for each as $E_c/I_o$, where $E_c$ is energy per CDMA chip for the pilot signal of a given wireless coverage area and $I_o$ is the total power received. Values of $E_c/I_o$ may range from 0 dB (very good signal strength) to −16 dB (very poor signal strength). It should be understood that $E_c/I_o$ measures a signal-to-noise ratio, but other methods of measuring signal strength, as well as other ranges of signal strength values, may be used.

If the pilot signal strength of any neighbor wireless coverage area exceeds T_ADD, the WCD may add the pilot to its "candidate" set, and transmit a pilot strength measurement message (PSMM) to the BSC with information indicative of the identity of the wireless coverage area. If the pilot strength exceeds any active wireless coverage area signal by T_COMP, the BSC may then transmit an HDM to the WCD, listing the pilot as a new member of the active set. Upon receipt of the HDM, the WCD may add the pilot to its active set as instructed, and transmit a Handoff Completion Message (HCM) to the BSC, acknowledging the instruction, and providing a list of the pilots (i.e., PN offsets) in its active set. This process of the WCD adding a new wireless coverage area to its active set is a soft handoff.

If the WCD detects that the signal strength of a pilot channel in its active set drops below T_DROP, the WCD starts a handoff drop timer. If T_TDROP passes without this signal strength exceeding T_DROP, the WCD may then transmit a PSMM to the BSC, indicating the wireless coverage area and the detected $E_c/I_o$. The BSC may then respond by transmitting an HDM to the WCD, without the wireless coverage area in the active set. The WCD may then receive the HDM and responsively move the wireless coverage area to its neighbor set and transmit an HCM to the BSC.

In this way, while the WCD is actively communicating (e.g., transmitting and/or receiving bearer data), the WCD may be receiving such communications from more than one wireless coverage area. Further, as the WCD moves about or the wireless channel conditions between the WCD and its serving BTS(s) change, membership in the WCD's active set, candidate set, neighbor set, and remaining set may also change. Generally speaking, the larger the WCD's active set, the more likely it is that the WCD will receive bearer data correctly.

c. Channel Assignment

Figure 4:
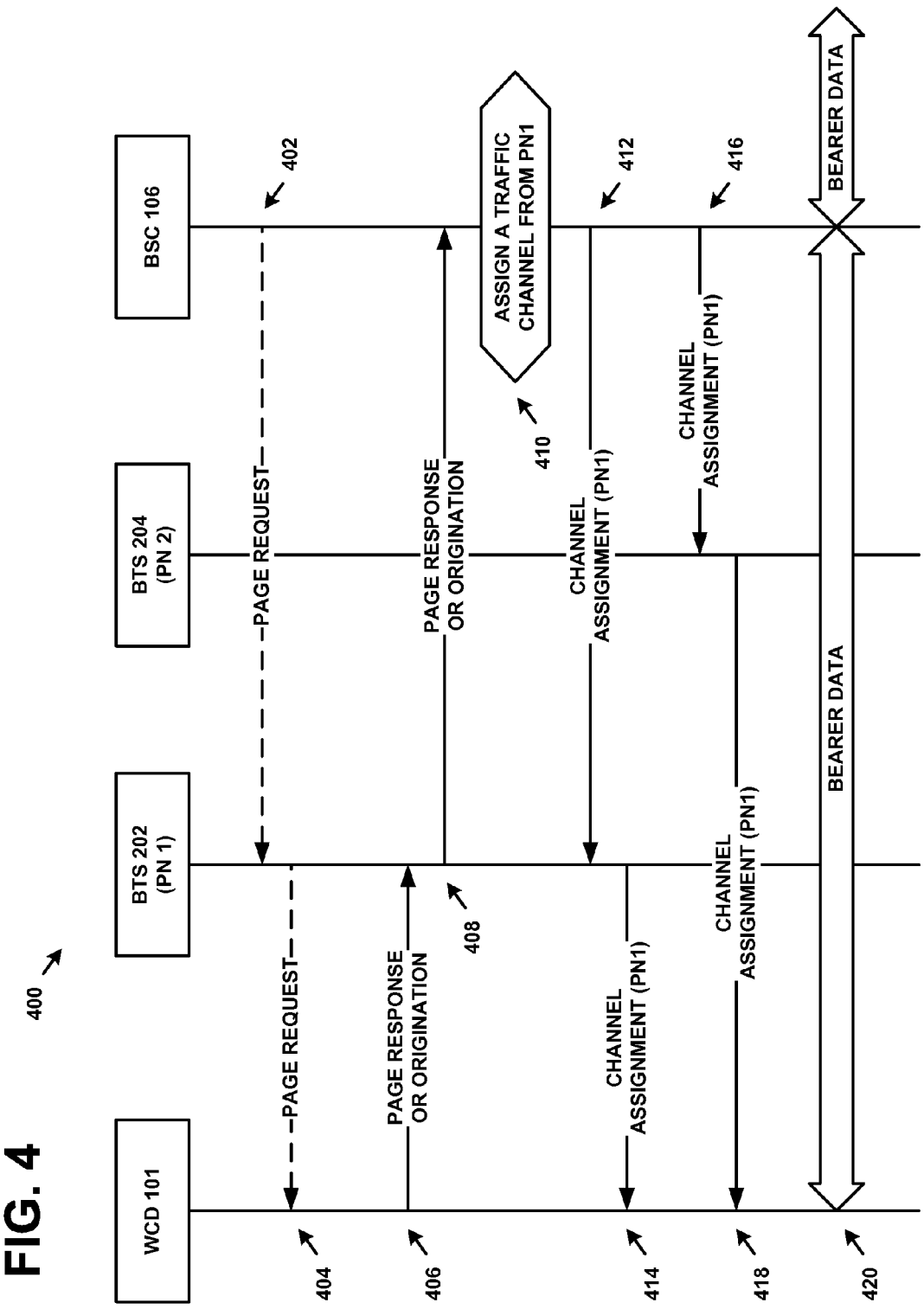
FIG. 4 is a first message flow diagram, in accordance with an example embodiment.

For purposes of illustration, FIG. 4 shows an example message flow 400 of a RAN transmitting channel assignment messages via multiple wireless coverage areas during call establishment. FIG. 4 involves WCD 101, BTS 202, BTS 204, and BSC 106. BTS 202 defines a wireless coverage area with PN offset 1 ("PN 1"), and BTS 204 defines another wireless coverage area with PN offset 2 ("PN 2"). BTS 202 and BTS 204 may be controlled by BSC 106. WCD 101 may be able to receive pilot channel signals of sufficient strength from both PN 1 and PN 2 such that WCD 101 could communicate effectively via either of these wireless coverage areas. Without loss of generality, it is assumed that PN 1 is the primary wireless coverage area of WCD 101.

WCD 101 may report, to BSC 106, measurements of the signal strengths at which WCD 101 receives the pilot channels of PN 1 and PN2. This reporting may occur through the transmission of radio environment reports or pilot strength measurement messages (PSMMs), or via a different type of message.

Steps 402 and 404 illustrate BSC 106, via BTS 202, transmitting an optional page request message to WCD 101. Such a page request message may be transmitted when WCD 101 is paged to answer an incoming voice call or to receive incoming data. Steps 406 and 408 illustrate WCD 101 transmitting a message via BTS 202 to BSC 106. This message may be a page response message transmitted on the access channel in response to the optional page request message. Alternatively, this message may be an origination message, also transmitted on the access channel, with which WCD 101 attempts to establish an outgoing voice or data call. Additional alternative message types may also be used for this purpose, and any such message may be transmitted on the access channel or another type of channel.

Regardless of whether an incoming or outgoing call is being established for WCD 101, at step 410, BSC 106 may assign a traffic channel to WCD 101. In a possible scenario, BSC 106 may assign a traffic channel from PN 1. When making the traffic channel assignment, BSC 106 may consider pilot channel signal strength measurements that it received from WCD 101. These considerations may be based on, for example, just the most recently-received measurement, or several recently received measurements. BSC 106 may use these received signal strengths, and/or other information, when determining from which wireless coverage area to assign a traffic channel. Thus, if BSC 106 determines that WCD 101 receives the pilot signal from PN 1 at a lower strength than that of PN 2, BSC 106 may instead assign a traffic channel from PN 2 to WCD 101.

At steps 412 and 414, BSC 106 may transmit a first channel assignment message via BTS 202 to WCD 101. The first channel assignment message may include a traffic channel assignment for PN 1. In other words, the first channel assignment message may instruct WCD 101 to use a particular Walsh code to receive from PN 1. Similarly, at steps 416 and 418, BSC 106 may transmit a second channel assignment message via BTS 204 to WCD 101. The second channel assignment message may also include a traffic channel assignment for PN 1 (thus, these two channel assignment messages may serve to assign the same channel). By transmitting multiple channel assignment messages to WCD 101, the likelihood that WCD 101 receives at least one of these messages is increased. Regardless, at step 420, WCD 101 may begin receiving bearer traffic via BTS 202 (using PN 1).

While message flow 400 shows only two channel assignment messages being transmitted to WCD 101, more or fewer channel assignment messages may be transmitted to WCD 101 without departing from the scope of the invention. Further, throughout message flow 400, the names of these messages are used for purposes of convenience and messages with other names may be used for similar purposes.

d. Substantially Simultaneous Transmission of Bearer Data

As described in Section IIb, when the RAN substantially simultaneously communicates bearer data with a WCD via more than one wireless coverage area, the RAN and WCD may be able to engage in soft handoff procedures. Soft handoff may result in fewer dropped calls and a higher overall call quality, especially if the WCD is in motion.

Figure 5:
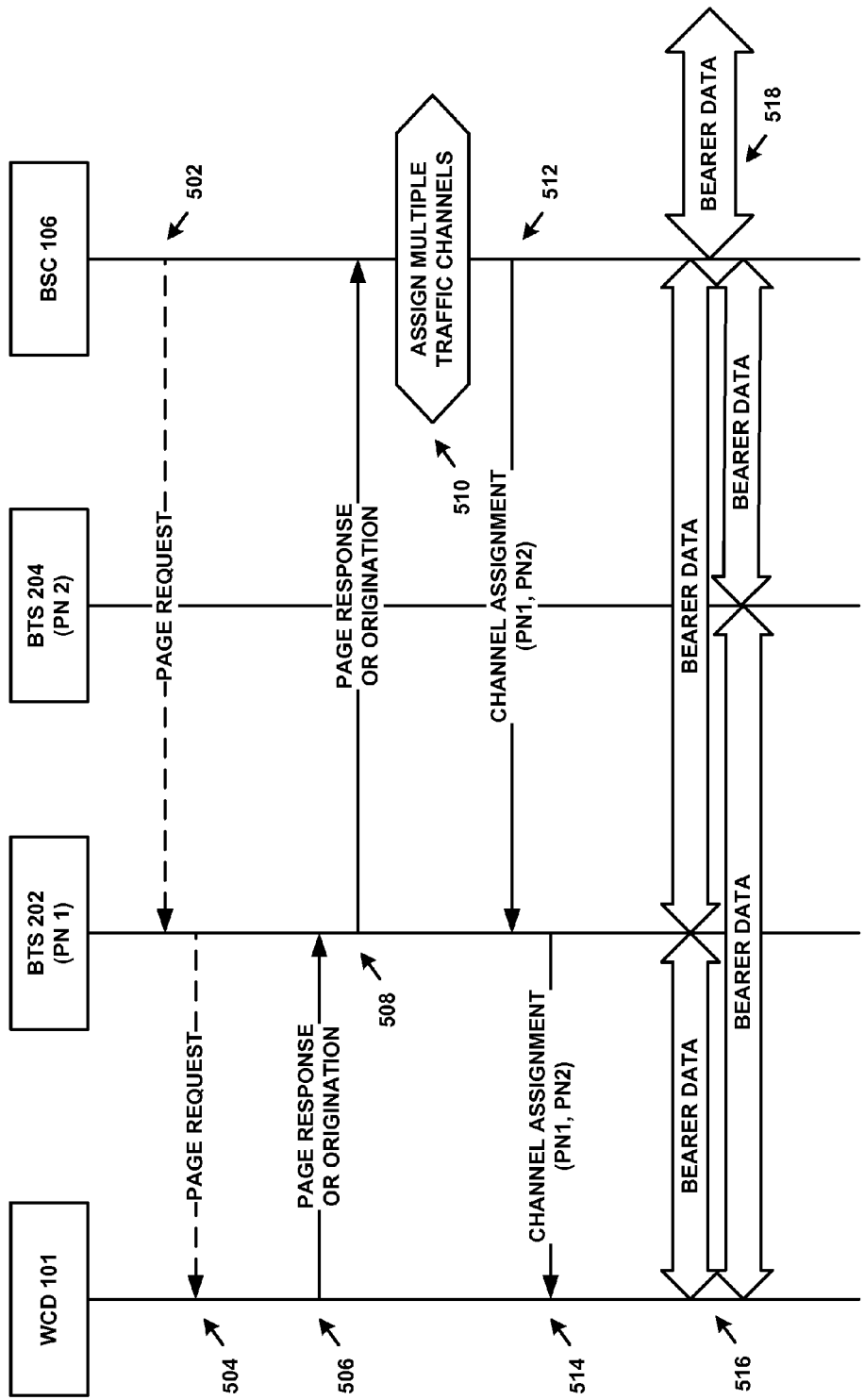
FIG. 5 is a second message flow diagram, in accordance with an example embodiment.

Channel Assignment into Soft Handoff (CASHO) has been proposed as a way of assigning multiple traffic channels from different wireless coverage areas to a WCD during call establishment. Thus, using CASHO procedures may increase the reliability and quality of the initial portions of the calls. For purposes of illustration, FIG. 5 shows an example message flow 500 of a RAN and WCD engaging in CASHO procedures. Like FIG. 4, FIG. 5 involves WCD 101, BTS 202, BTS 204, and BSC 106.

Steps 502 and 504 illustrate BSC 106, via BTS 202, transmitting an optional page request message to WCD 101. Steps 506 and 508 illustrate WCD 101 transmitting a page response message or origination message via BTS 202 to BSC 106. At step 510, BSC 106 may assign multiple traffic channels to WCD 101. In particular, BSC 106 may assign one traffic channel from PN 1, and another traffic channel from PN 2, to WCD 101, in accordance with CASHO procedures. When making the traffic channel assignment, BSC 106 may consider pilot channel signal strength measurements that it received from WCD 101. BSC 106 may receive these signal strengths in radio environment reports or PSMMs, the page response or origination message of steps 506 and 508, or in some other type of message. In any case, BSC 106 may use these received signal strengths, and/or other information, when determining whether and/or how to perform CASHO procedures.

At steps 512 and 514, BSC 106 may transmit a channel assignment message via BTS 202 to WCD 101. The channel assignment message may include traffic channel assignments for both PN 1 and PN 2. In other words, the channel assignment message may instruct WCD 101 to use a particular Walsh code with PN 1 and another Walsh code with PN 2. Accordingly, at steps 516 and 518, WCD 101 may begin transmitting and receiving bearer data via both BTS 202 (using PN 1) and BTS 204 (using PN 2). Thus, via both BTS 202 and BTS 204, WCD 101 may receive forward direction bearer data streams from BSC 106, and may combine these streams into a single stream of bearer data. For example, WCD 101 may add the received signals from BTS 202 and BTS 204. Conversely, via both BTS 202 and BTS 204, BSC 106 may receive reverse direction bearer data streams from WCD 101, and may also combine these streams into a single stream of bearer data.

It should be understood that rather than traversing BTS 202, any of the page request messages, page response or origination messages, and/or channel assignment messages may instead traverse BTS 204, or both BTS 202 and BTS 204. Alternatively, BSC 106 may assign WCD 101 traffic channels from two different PNs defined by the same BTS. Further, the names of these messages are used for purposes of convenience and messages with other names may be used for similar purposes. Additionally, CASHO procedures may be performed such that more than two traffic channels are assigned to a WCD during call initiation.

III. Example Media Codecs

As noted above, a media codec may encode an analog or digital stream of information (e.g., voice, video, still images, music, data, and so on) for transmission and/or storage. For example, a source WCD may include a voice codec that receives a spoken utterance from a user, and encodes this utterance according to a particular format. The source WCD may then transmit the encoded utterance to a destination WCD. The destination WCD may use the same (or a similar) voice codec to decode the utterance from the particular format so that the destination WCD can play out the resulting signal.

Media codecs may be either lossless or lossy. Lossless media codecs may use an encoding format that allows the encoded media to be decoded back to its original format. Thus, lossless media codecs may support high quality transmission and storage of media.

On the other hand, some media codecs are lossy. Lossy codecs are typically used on media for which some degree of degradation is acceptable. For instance, compact disc audio can be compressed to about 10-20% of its size (i.e., achieving about 80-90% compression) by using an MP3 codec to discard the audio components that are beyond the auditory resolution ability of most individuals. Thus, to most listeners, music encoded in the MP3 format sounds about the same as it would if played directly from the compact disc. Similarly, voice codecs may take advantage of psychoacoustics to remove redundant or less audible components of voice signals, resulting in about 80-90% compression of the voice signal.

In general, different lossy codecs may support different extents of lossy compression (e.g., some codecs will support compression with more loss than other codecs). Some lossy codecs may support multiple extents of lossy compression (e.g., a particular codec may select between two or more rates of lossy compression).

In general, there may be a roughly linear relationship between media codec bitrate and the media quality that the media codec produces at that bitrate. For example, a voice codec operating at 9.6 kilobits per second is likely to produce better quality voice than a voice codec operating at 4.8 kilobits per second. However, as media codec technologies advance, new media codecs may be introduced that are capable of supporting equal or better media quality at a lower bitrate. Thus, in some cases, a voice codec that operates at 8.5 kilobits per second may produce better voice quality than the voice codec operating at 9.6 kilobits per second. Furthermore, some voice codecs are capable of supporting multiple different encoding rates, and perhaps even switching between these rates dynamically to adapt to the characteristics of the input signal and/or to achieve a target bitrate.

In order to further illustrate these aspects of media codecs, several different voice codecs are compared and contrasted below. Particularly, CDMA wireless networks may use one or more media codecs from the Enhanced Variable Rate Codec (EVRC) family.

For instance, the EVRC-A codec operates on input speech signals sampled with 16-bit resolution 8,000 times per second (e.g., 8,000 Hz). The resulting 128 kilobit per second stream is divided into 20 millisecond frames, each of which is compressed to either 171 bits (8.55 kilobit per second), 80 bits (4.0 kilobits per second), or 16 bits (0.8 kilobits per second). EVRC-A may also be referred to as CMDA service option 3.

The EVRC-B codec also operates on input speech signals sampled with 16-bit resolution 8,000 times per second, and supports the three compressed bitrates supported by EVRC-A. However, EVRC-B also supports a compressed frame size of 40 bits (2.0 kilobits per second). Additionally, EVRC-B may support eight operating points, each defining a target bitrate. These operating points may define target bitrates as indicated in Table 1.

TABLE 1

| Operating Point | Target Bitrate (kilobits per second) |
| --- | --- |
| 0 | 9.3 |
| 1 | 8.5 |
| 2 | 7.5 |
| 3 | 7.0 |
| 4 | 6.6 |
| 5 | 6.2 |
| 6 | 5.8 |
| 7 | 4.8 |

Alternatively, some implementations of EVRC may support operating points that define arbitrary target bitrates. Regardless, when configured to operate at one of these operating points, EVRC-B may attempt to achieve the desired bitrate by switching between two or more of the supported frame sizes. EVRC-B may also be referred to as CMDA service option 68.

The EVRC-WB codec is a "wideband" variation of EVRC-B. Particularly, EVRC-WB operates on input speech signals sampled with 16-bit resolution at 8,000 or 16,000 times per second. When sampling at the rate of 8,000 times per second, frames encoded with EVRC-WB can be compatible with EVRC-B encodings. When sampling at 16,000 times per second, frames encoded with EVRC-WB are 171 bits (8.55 kilobit per second). However, unlike the 171 bit frames produced when sampling at 8,000 times per second, the EVRC-WB frames include high-frequency components from the 3.5 kHz to 7 kHz range. Thus, at the same bitrate, EVRC-WB may be capable of producing higher quality voice calls than EVRC-A or EVRC-B. In addition to its own target bitrates, EVRC-WB supports two of the operating points of EVRC-B.

EVRC-WB also supports a mode for improved encoding of non-speech signals, such as music-on-hold. EVRC-WB may also be referred to as CMDA service option 70.

The EVRC-NW codec supports at least some of the encodings of both EVRC-B and EVRC-WB. Particularly, EVRC-NW supports the sampling frequencies and frame sizes of EVRC-WB. Also, EVRC-WB supports seven of the operating points (and associated target bitrates) of EVRC-B, and also supports the mode for improved encoding of non-speech signals. Thus, EVRC-NW is fully compatible with EVRC-WB, and supports more operating modes of EVRC-B than EVRC-WB. EVRC-NW may also be referred to as CMDA service option 73.

The media codecs described herein are only examples. Other voice or non-voice codecs may be used instead.

IV. Example Operations

Since different media codecs may support different bitrates or other features, it may be advantageous to consider the types of media codecs available for assignment to a WCD and/or the features supported by these media codecs when assigning traffic channels to the WCD. Conversely, if wireless coverage areas are selected for the WCD to use during subsequent communication before a media codec is chosen for this communication, it may be advantageous to choose a media codec with features that are suited to the capacity available to the WCD via the selected coverage areas.

TABLE 2

| Media Codec Type | Target Number of Wireless Coverage Areas | Maximum Number of Wireless Coverage areas |
| --- | --- | --- |
| EVRC-A | 2 | 3 |
| EVRC-B | 3 | 4 |
| EVRC-WB | 4 | 5 |
| EVRC-NW | 6 | 6 |

Table 2 depicts an example of how a target number of wireless coverage areas can be based on a media codec type chosen for a WCD. For instance, if the EVRC-A media codec is chosen, the RAN may attempt to assign 2 wireless coverage areas to the WCD. If the EVRC-B media codec is chosen the RAN may attempt to assign 3 wireless coverage areas to the WCD. If the EVRC-WB media codec is chosen, the RAN may attempt to assign 4 wireless coverage areas to the WCD. If the EVRC-NW media codec is chosen, the RAN may attempt to assign 6 wireless coverage areas to the WCD.

Table 2 also depicts an example of how the maximum number of wireless coverage areas assigned to the WCD may be also based on the media codec type chosen for the WCD. For instance, if the EVRC-A media codec is chosen, the RAN may assign at most 3 wireless coverage areas to the WCD. If the EVRC-B media codec is chosen the RAN may assign at most 4 wireless coverage areas to the WCD. If the EVRC-WB media codec is chosen, the RAN may assign at most 5 wireless coverage areas to the WCD. If the EVRC-NW media codec is chosen, the RAN may assign at most 6 wireless coverage areas to the WCD.

Thus, both the target number of wireless coverage areas to be assigned to the WCD and the maximum number thereof may be selected to scale in proportion to a bitrate and/or sampling frequency supported by the selected media codec. For example, the EVRC-WB and the EVRC-NW media codecs may be capable of supporting higher bitrates and/or sampling frequencies than the EVRC-A and EVRC-B media codecs. Thus, Table 2 indicates that the target number of wireless coverage areas to be assigned to the WCD and the maximum number of wireless coverage areas that can be assigned to the WCD may be higher for the EVRC-WB and the EVRC-NW media codecs than for the EVRC-A and EVRC-B media codecs.

Additionally, when two or more wireless coverage areas are assigned to a WCD, the WCD may engage access handoff and/or CASHO procedures with these wireless coverage areas. Thus, the WCD and the RAN may communicate substantially simultaneously via the assigned wireless coverage areas.

In some embodiments, the assigned wireless coverage areas may include a primary wireless coverage area and one or more secondary wireless coverage areas. The WCD may receive signals via the primary wireless coverage area at a primary signal strength, and signals via the one or more secondary wireless coverage areas at respective secondary signal strengths. Typically, the WCD may receive signals via the primary coverage area at a higher strength than the WCD receives signals via the secondary wireless coverage areas, but this may not always be the case.

Nonetheless, the wireless coverage areas to assign to the WCD may be chosen based on differences between the primary signal strength and the respective secondary signal strengths. For instance, the RAN may assign, to the WCD, the primary wireless coverage area and zero or more of the secondary wireless coverage areas for which the respective differences between the primary signal strength and the respective secondary signal strengths are less than a threshold difference.

TABLE 3

| Signal Strength of Primary Wireless Coverage Area | Signal Strength of Secondary Wireless Coverage Area A | Signal Strength of Secondary Wireless Coverage Area B | Signal Strength of Secondary Wireless Coverage Area C |
| --- | --- | --- | --- |
| −2 dB | −4 dB | −12 dB | −7 dB |
| −6 dB | −16 dB | −4 dB | −8 dB |

Table 3 depicts examples in which WCDs are receiving signals from a primary wireless coverage area and three secondary wireless coverage areas. The threshold difference in signal strength is presumed to be 4 dB.

In the first example of Table 2, the WCD receives signals from the primary wireless coverage area at a strength of −2 dB. The WCD also receive signals from secondary wireless coverage areas A, B, and C at strengths of −4 dB, −12 dB, and −7 dB, respectively. The only secondary wireless coverage area that the WCD receives at a signal strength within 4 dB of the signal strength of the primary wireless coverage area is secondary wireless coverage area A. The signals that the WCD receives from secondary wireless coverage areas B and C are too weak. Therefore, in this example, only the primary wireless coverage area and secondary wireless coverage area A would be assigned to the WCD.

In the second example of Table 2, the WCD receives signals from the primary wireless coverage area at a strength of −6 dB. The WCD also receive signals from secondary wireless coverage areas A, B, and C at strengths of −16 dB, −4 dB, and −8 dB, respectively. Thus, the WCD receives signals from secondary wireless coverage areas B and C at strengths that are within 4 dB of the signal strength that the WCD receives from the primary wireless coverage area. Therefore, the primary wireless coverage area, secondary wireless coverage area B, and secondary wireless coverage area C may be assigned to the WCD.

Note that in the second example, the WCD receives signals from secondary wireless coverage area B at a greater strength than the WCD receives signals from the primary wireless coverage area. In general, when a WCD receives signals from a particular secondary wireless coverage area at a greater strength than the WCD receives signals from a primary wireless coverage area, the particular secondary wireless coverage area may be assigned to the WCD regardless of the difference in the respective received signal strengths.

In some embodiments, the threshold difference may vary based on the media codec type. In general, the threshold difference may scale in proportion to a bitrate and/or sampling frequency supported by the selected media codec. Thus, for instance, EVRC-WB and EVRC-NW may be associated with a higher threshold difference than EVRC-A or EVRC-B. Therefore, EVRC-WB and EVRC-NW are more likely to be associated with wireless coverage areas through which the WCD receives signals with higher signal strengths. These higher-signal-strength signals are more likely to be able to support the greater target bitrates and/or sampling frequencies of EVRC-WB and EVRC-NW.

TABLE 4

| Operating Point | Target Bitrate (kilobits per second) | Target Number of Wireless Coverage Areas | Maximum Number of Wireless Coverage areas |
| --- | --- | --- | --- |
| 0 | 9.3 | 6 | 6 |
| 1 | 8.5 | 5 | 6 |
| 2 | 7.5 | 5 | 6 |
| 3 | 7.0 | 4 | 5 |
| 4 | 6.6 | 4 | 5 |
| 5 | 6.2 | 3 | 5 |
| 6 | 5.8 | 2 | 4 |
| 7 | 4.8 | 2 | 4 |

Table 4 depicts an alternative embodiment in which the target number of wireless coverage areas and/or the maximum number of wireless coverage areas may be based on the operating point and/or target bitrate of the chosen media codec. For purpose of illustration, operating points and target bitrates associated with EVRC-B are shown. As indicated in Table 4, more wireless coverage areas may be assigned to a WCD when a media codec operating point representing a higher bitrate is used. Likewise, the maximum number of wireless coverage areas that might be assigned to a WCD increases when a media codec operating point representing a higher bitrate is used. Thus, both the target number of wireless coverage areas to be assigned to the WCD and the maximum number thereof may be selected to scale in proportion to a target bitrate associated with a selected media codec operating point.

Additionally, this embodiment may also involve choosing wireless coverage areas to assign to the WCD based on the differences between a primary signal strength and respective secondary signal strengths, as received by the WCD. As was described in the context of Table 3, the WCD may be assigned the primary wireless coverage area and zero or more of the secondary wireless coverage areas for which the respective differences between the primary signal strength and the respective secondary signal strengths are less than a threshold difference.

Also, the threshold difference may vary based on the target bitrate of the operating point. In general, the threshold difference may scale in proportion to this target bitrate. Thus, for instance, operating points 0 and 1 of Table 4 may be associated with a higher threshold difference than operating points 6 and 7 of Table 4.

In alternative embodiments, the RAN may select a set of two or more wireless coverage areas to serve a WCD. Then, a call type that the WCD uses for the call may be determined. Based on the call type, one or more of the wireless coverage areas may be removed from the set. The WCD may engage in communication via the wireless coverage areas that remain in the set.

TABLE 5

| Service Option | Maximum Number of Wireless Coverage Areas | Threshold Difference |
|---|---|---|
| 33 (data) or 59 (high-speed data) | 3 | 8 dB |
| 3 (EVRC-A) | 4 | 6 dB |
| 68 (EVRC-B) | 5 | 5 dB |
| 70 (EVRC-WB) or 73 (EVRC-NW) | 6 | 4 dB |

Table 5 depicts how the maximum number of wireless coverage areas to assign to a WCD may be based on the call type (in this case, the service option) of a call. For instance, if the service option is 33 or 59, the call type may be data, and the maximum number of wireless coverage areas may be limited to 3. If the service option is 3, the call type may be low-definition voice using EVRC-A, and the maximum number of wireless coverage areas may be limited to 4. If the service option is 68, the call type may be low-definition voice using EVRC-B, and the maximum number of wireless coverage areas may be limited to 5. If the service option is 70 or 73, the call type may be high-definition voice using EVRC-WB or EVRC-NW, respectively, and the maximum number of wireless coverage areas may be limited to 6.

Perhaps based on a table such as Table 5, wireless coverage areas may be removed from the set of wireless coverage areas so that no more than the indicated maximum number of wireless coverage areas that remain. Determining the wireless coverage areas to remove from the set may be based on the respective differences between a primary signal strength and the respective secondary signal strengths received by the WCD. Particularly, one or more of the secondary wireless coverage areas for which the differences between the primary signal strength and the respective secondary signal strengths are greater than a threshold difference may be removed.

The threshold difference may be based on the call type. Thus, for instance, Table 5 illustrate that for service options 33 and 59, a threshold difference of 8 dB may be used. For service option 3, a threshold difference of 6 dB may be used. For service option 68, a threshold difference of 5 dB may be used. For service options 70 and 73, a threshold difference of 4 dB may be used.

TABLE 6

| Operating Point | Target Bitrate (kilobits per second) | Maximum Number of Wireless Coverage areas | Threshold Difference |
|---|---|---|---|
| 0 | 9.3 | 6 | 4 dB |
| 1 | 8.5 | 6 | 4 dB |
| 2 | 7.5 | 6 | 5 dB |
| 3 | 7.0 | 5 | 5 dB |
| 4 | 6.6 | 5 | 6 dB |
| 5 | 6.2 | 5 | 6 dB |
| 6 | 5.8 | 4 | 8 dB |
| 7 | 4.8 | 4 | 8 dB |

Table 6 depicts an alternative embodiment in which the maximum number of wireless coverage areas and/or the threshold difference may be based on the operating point and/or target bitrate of the media codec. For purpose of illustration, operating points and target bitrates associated with EVRC-B are shown. As indicated in Table 6, the maximum number of wireless coverage areas that might assigned to a WCD increases when a media codec operating point representing a higher bitrate is used. Also, the threshold difference may be inversely proportion to the target bitrate of the media codec operating point.

It should be noted that data appearing in Tables 1-6, are provided for purpose of example. In some implementations, this data may take on different values, and/or more of fewer entries may be included in some of the tables.

FIGS. 6, 7, 8, and 9 are flow charts depicting example embodiments. One or more steps of either of both of these example embodiments may be carried out, for instance, by a RAN component exemplified by RAN device 300.

Figure 6:
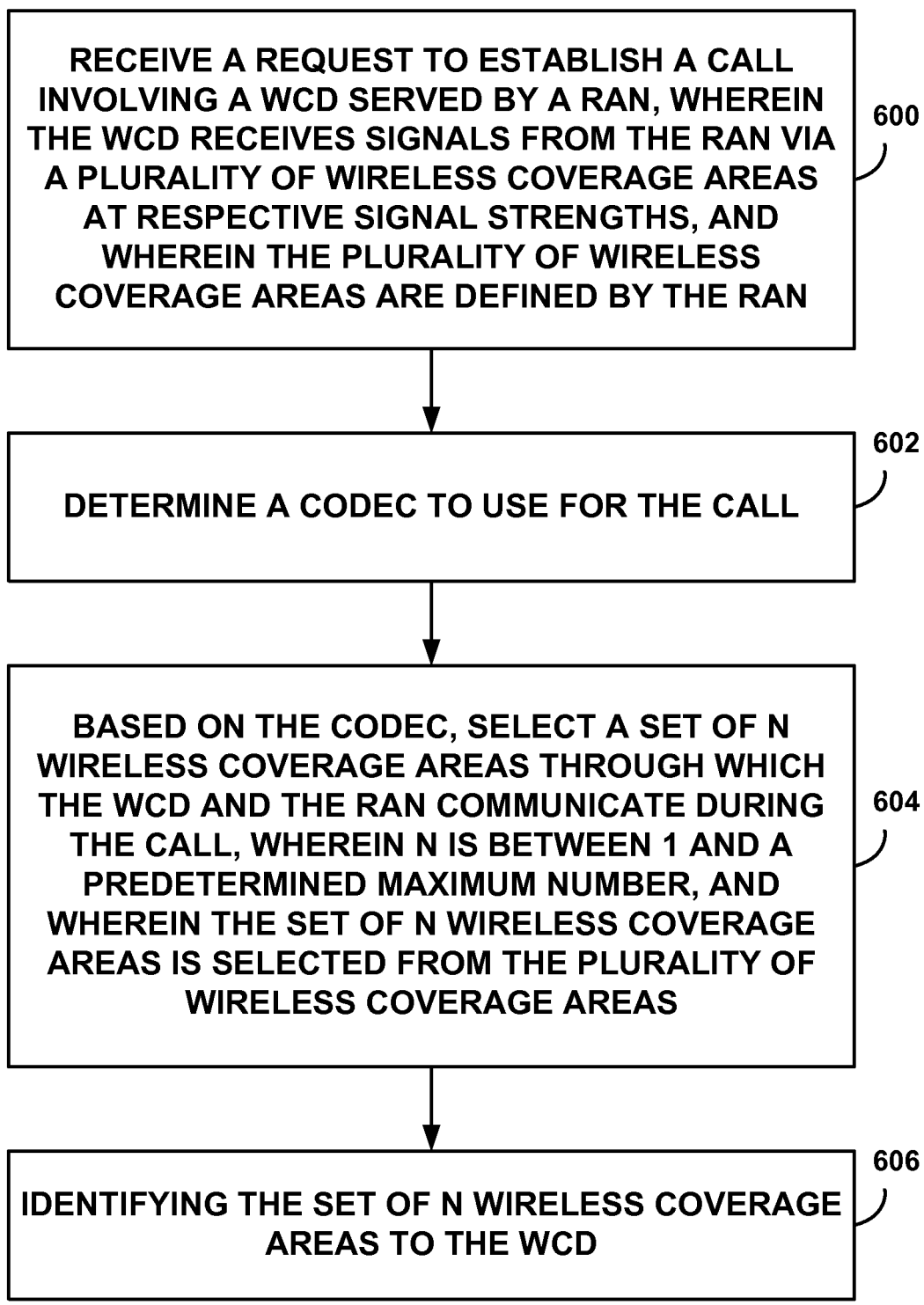
FIG. 6 is a first flow chart, in accordance with an example embodiment.

At step 600 of FIG. 6, a request to establish a call involving a WCD served by a RAN may be received. The WCD may receive signals from the RAN via a plurality of wireless coverage areas at respective signal strengths. The plurality of wireless coverage areas may be defined by the RAN. At step 602, possibly in response to receiving the request, a media codec to use for the call may be determined.

At step 604, based on the media codec, a set of n wireless coverage areas through which the WCD and the RAN communicate during the call may be selected. The value of n may be between 1 and a predetermined maximum number, and the set of n wireless coverage areas may be selected from the plurality of wireless coverage areas. At step 606, the set of n wireless coverage areas may be identified to the WCD.

Selecting the set of n of wireless coverage areas through which the WCD and the RAN communicate during the call may involve selecting two or more wireless coverage areas. The WCD and the RAN may communicate substantially simultaneously via the two or more selected wireless coverage areas. For instance, during establishment of the call, the RAN may assign, to the WCD, respective traffic channels from each of the two or more wireless coverage areas. Further, during an initial portion of the call, the RAN may substantially simultaneously exchange bearer traffic with the WCD via each of the assigned traffic channels. Alternatively or additionally, the RAN may transmit and/or receive identical copies of the same bearer traffic via each of the assigned traffic channels. In some embodiments, the substantially simultaneous communications may traverse each of the two or more wireless coverage areas at approximately the same time. Moreover, during establishment of the call, the RAN may transmit channel assignment messages to the WCD respectively via the two or more wireless coverage areas.

Both the number of selected wireless coverage areas and the maximum number thereof may be selected to scale in proportion to a bitrate and/or sampling frequency of the media codec. Thus, for example, n may be based on bitrates supported by the media codec, and/or based on sampling frequencies supported by the media codec. Alternatively or additionally, the predetermined maximum number of wireless coverage areas that can be used per call may be based on the media codec.

In some embodiments, the plurality of wireless coverage areas may include a primary wireless coverage area and one or more secondary wireless coverage areas. The WCD may receive signals via the primary wireless coverage area at a primary signal strength, and signals via the one or more secondary wireless coverage areas at respective secondary signal strengths. Selecting the n wireless coverage areas through which the WCD and the RAN communicate during the call may involve determining respective differences between the primary signal strength and the respective secondary signal strengths, and selecting (i) the primary wireless coverage area, and (ii) zero or more of the secondary wireless coverage areas for which the respective differences between the primary signal strength and the respective secondary signal strengths are less than a threshold difference.

Figure 7:
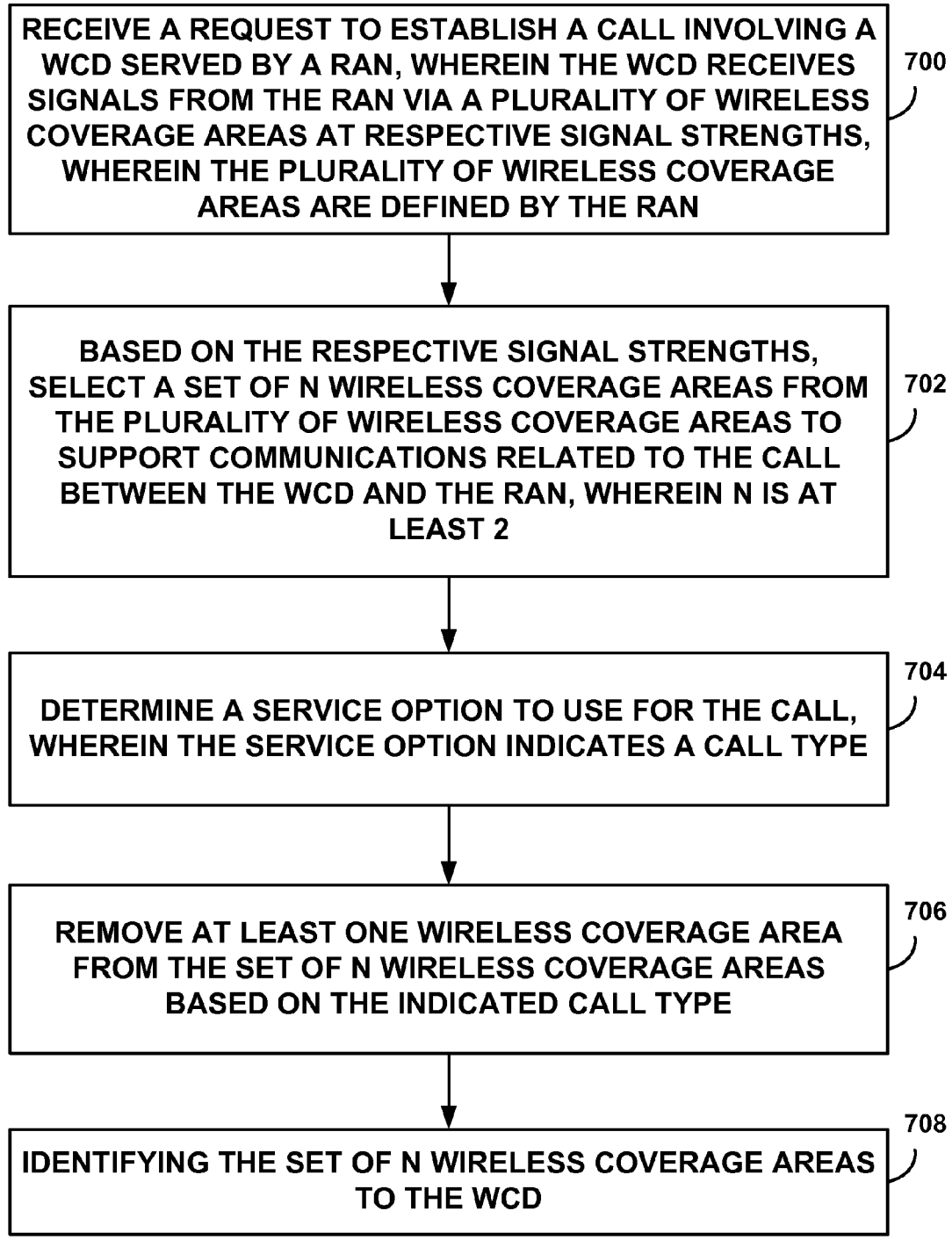
FIG. 7 is a second flow chart, in accordance with an example embodiment.

FIG. 7 depicts another example embodiment. At step 700, a request to establish a call involving a WCD served by a RAN may be received. The WCD may receive signals from the RAN via a plurality of wireless coverage areas at respective signal strengths. The plurality of wireless coverage areas may be defined by the RAN.

At step 702, based on the respective signal strengths, a set of n wireless coverage areas may be selected from the plurality of wireless coverage areas to support communications related to the call between the WCD and the RAN. The value of n may be at least 2. At step 704, a service option to use for the call may be determined. The service option may indicate a call type.

At step 706, at least one wireless coverage area may be removed from the set of n wireless coverage areas based on the indicated call type. At step 708, the set of n wireless coverage areas may be identified to the WCD.

Removing at least one wireless coverage area from the set of n wireless coverage areas based on the indicated call type may involve selecting a maximum number, m, of wireless coverage areas based on the indicated call type, determining that n is greater than m, and in response to determining that n is greater than m, removing at least n-m wireless coverage areas from the set n of wireless coverage areas.

In some embodiments, the indicated call type may be either a data call type, a low-definition voice call type, or a high-definition voice call type. Selecting the maximum number, m, of wireless coverage areas based on the indicated call type may further involve selecting a predetermined value for m. For instance, a first predetermined value for m may be selected when the indicated call type is the data call type. On the other hand, a second predetermined value for m may be selected when the indicated call type is the low-definition voice call type. The second predetermined value may be greater than the first predetermined value. Additionally, a third predetermined value for m may be selected when the indicated call type is the high-definition voice call type. The third predetermined value may be greater than the second predetermined value. In some implementations, media codecs associated with the low-definition voice call type may use a sampling frequency of 8,000 Hz or less, and media codecs associated with the high-definition voice call type may use a sampling frequency above 8,000 Hz.

Furthermore, the plurality of wireless coverage areas may include a primary wireless coverage area and one or more secondary wireless coverage areas. The WCD may receive signals via the primary wireless coverage area at a primary signal strength, and signals via the one or more secondary wireless coverage areas at respective secondary signal strengths. Removing at least one wireless coverage areas from the set of n wireless coverage areas based on the indicated call type may involve determining respective differences between the primary signal strength and the respective secondary signal strengths, selecting one or more of the secondary wireless coverage areas for which the respective differences between the primary signal strength and the respective secondary signal strengths are greater than a threshold difference, removing the selected one or more of the secondary wireless coverage areas from the set of n wireless coverage areas. The threshold difference may be based on the indicated call type.

Figure 8:
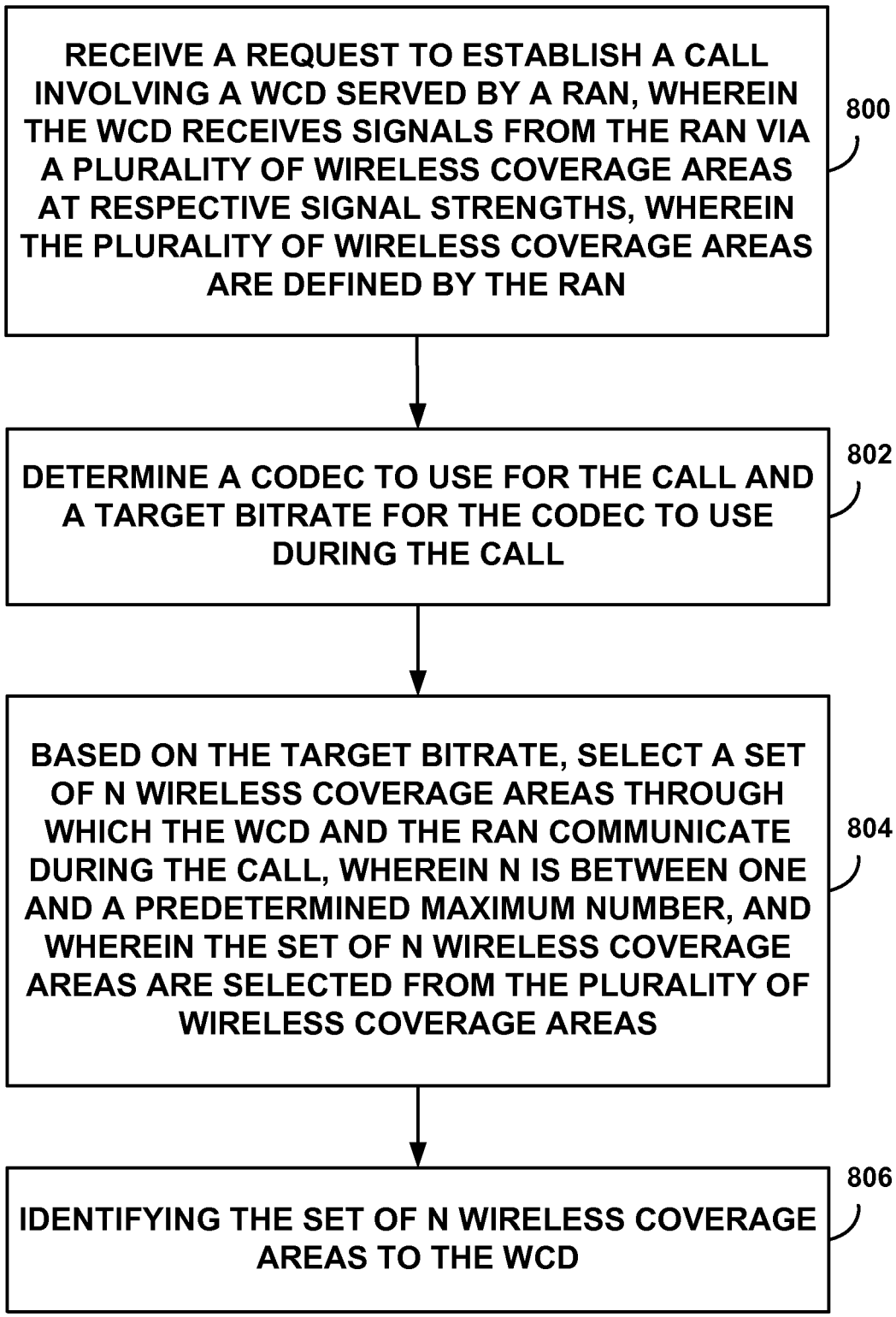
FIG. 8 is a third flow chart, in accordance with an example embodiment.

FIG. 8 depicts yet another example embodiment. At step 800, a request to establish a call involving a WCD served by a RAN may be received. The WCD may receive signals from the RAN via a plurality of wireless coverage areas at respective signal strengths. The plurality of wireless coverage areas may be defined by the RAN. At step 802, a media codec to use for the call and a target bitrate for the media codec to use during the call may be determined.

At step 804, based on the target bitrate, a set of n wireless coverage areas through which the WCD and the RAN communicate during the call may be selected. The value of n may be between one and a predetermined maximum number. The set of n wireless coverage areas may be selected from the plurality of wireless coverage areas. At step 806, the set of n wireless coverage areas may be identified to the WCD.

Selecting the set of n of wireless coverage areas through which the WCD and the RAN communicate during the call may involve selecting two or more wireless coverage areas. The WCD and the RAN may communicate substantially simultaneously via the two or more selected wireless coverage areas. For instance, during establishment of the call, the RAN may assign, to the WCD, respective traffic channels from each of the two or more wireless coverage areas. Further, during an initial portion of the call, the RAN may substantially simultaneously exchange bearer traffic with the WCD via each of the assigned traffic channels. Alternatively or additionally, the RAN may transmit and/or receive identical copies of the same bearer traffic via each of the assigned traffic channels. In some embodiments, the substantially simultaneous communications may traverse each of the two or more wireless coverage areas at approximately the same time. Moreover, during establishment of the call, the RAN may transmit channel assignment messages to the WCD respectively via the two or more wireless coverage areas.

Both the number of selected wireless coverage areas and the maximum number thereof may scale in proportion to a selected target bitrate and/or sampling frequency of the media codec. Thus, for example, n may be based on the selected target bitrate, and/or based on a sampling frequency used by the media codec when operating at the target bitrate. Alternatively or additionally, the predetermined maximum number of wireless coverage areas that can be used per call may be based on the target bitrate.

Additionally or alternatively, the plurality of wireless coverage areas may include a primary wireless coverage area and one or more secondary wireless coverage areas. The WCD may receive signals via the primary wireless coverage area at a primary signal strength, and receives signals via the one or more secondary wireless coverage areas at respective secondary signal strengths. Selecting the set of n wireless coverage areas through which the WCD and the RAN communicate during the call may involve determining respective differences between the primary signal strength and the respective secondary signal strengths, and selecting (i) the primary wireless coverage area, and (ii) zero or more of the secondary wireless coverage areas for which the respective differences between the primary signal strength and the respective secondary signal strengths are less than a threshold difference.

Figure 9:
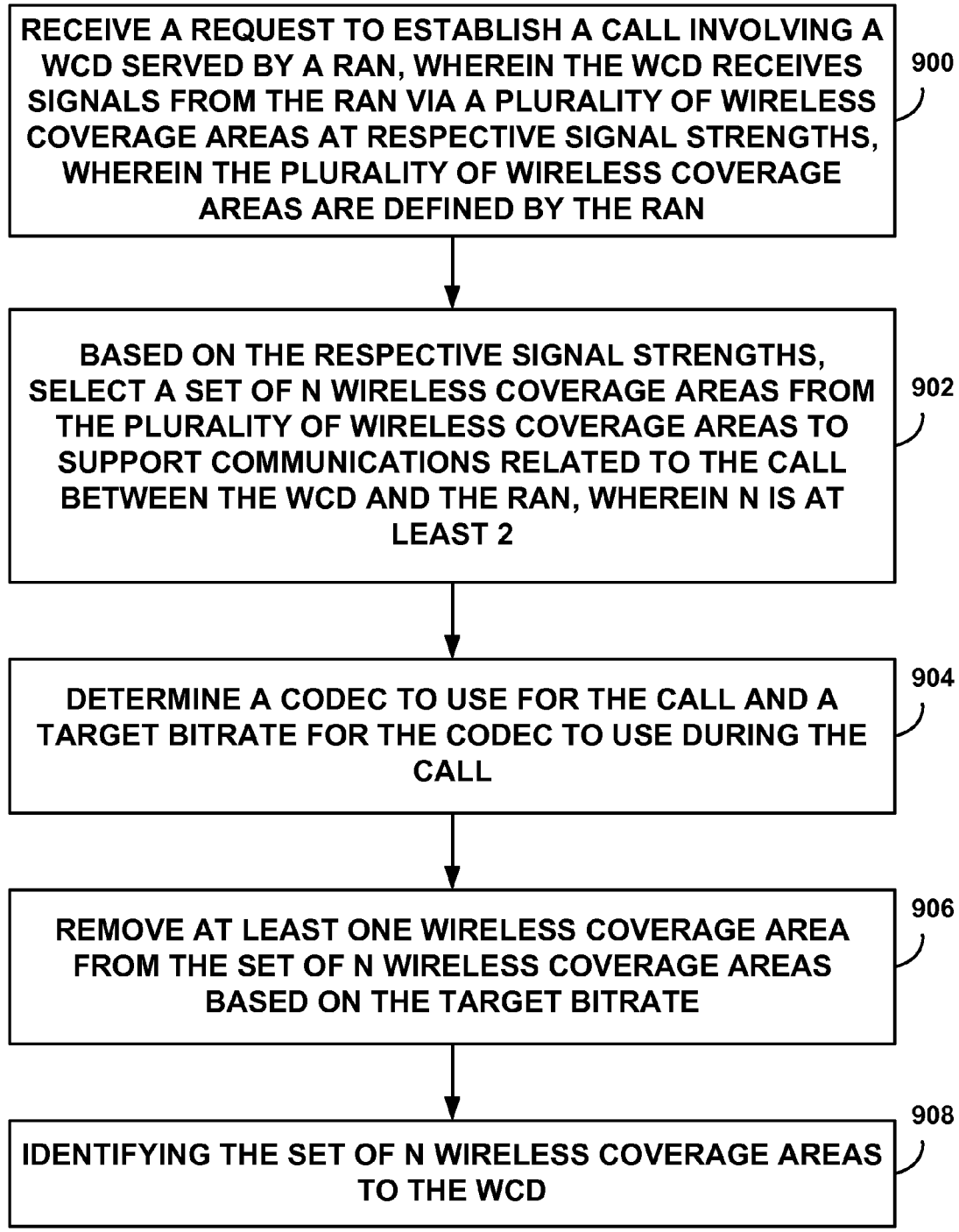
FIG. 9 is a fourth flow chart, in accordance with an example embodiment.

FIG. 9 depicts still another example embodiment. At step 900, a request to establish a call involving a WCD served by a RAN may be received. The WCD may receive signals from the RAN via a plurality of wireless coverage areas at respective signal strengths. The plurality of wireless coverage areas may be defined by the RAN.

At step 902, based on the respective signal strengths, a set of n wireless coverage areas may be selected from the plurality of wireless coverage areas to support communications related to the call between the WCD and the RAN. The value of n may be at least 2.

At step 904, a media codec to use for the call and a target bitrate for the media codec to use during the call may be determined. The selection of the media codec and/or the target bitrate may be based on the value of n and/or characteristics of the set of n wireless coverage areas.

At step 906, at least one wireless coverage area may be removed from the set of n wireless coverage areas based on the target bitrate. At step 908, the set of n wireless coverage areas may be identified to the WCD.

Removing at least one wireless coverage area from the set of n wireless coverage areas based on the target bitrate may involve selecting a maximum number, m, of wireless coverage areas based on the target bitrate, determining that n is greater than m, in response to determining that n is greater than m, removing at least n-m wireless coverage areas from the set of n wireless coverage areas.

In some embodiments, the target bitrate may be either (i) at or below a threshold bitrate, or (ii) above the threshold bitrate. Selecting the maximum number, m, of wireless coverage areas based on the target bitrate may further involve selecting a first predetermined value for m when the target bitrate is at or below the threshold bitrate, or selecting a second predetermined value for m when the target bitrate is above the threshold bitrate. The second predetermined value may be greater than the second predetermined value. Additionally, the threshold bitrate may be 4,000 bits per second, or may take on some other value, such as 1,000 bits per second, 2,000 bits per second, or 6,000 bits per second.

In some embodiments, the plurality of wireless coverage areas may include a primary wireless coverage area and one or more secondary wireless coverage areas. The WCD may receive signals via the primary wireless coverage area at a primary signal strength, and signals via the one or more secondary wireless coverage areas at respective secondary signal strengths. Removing at least one wireless coverage area from the set of n wireless coverage areas based on the target bitrate may involve determining respective differences between the primary signal strength and the respective secondary signal strengths, selecting one or more of the secondary wireless coverage areas for which the respective differences between the primary signal strength and the respective secondary signal strengths are greater than a threshold difference, and removing the selected one or more of the secondary wireless coverage areas from the set of n wireless coverage areas.

The threshold difference may be based on the target bitrate. For instance, target bitrate may be either (i) at or below a threshold bitrate, or (ii) above the threshold bitrate. Selecting one or more of the secondary wireless coverage areas for which the respective differences between the primary signal strength and the respective secondary signal strengths are greater than the threshold difference further may involve selecting a first predetermined threshold difference as the threshold difference when the target bitrate is at or below the threshold bitrate, and selecting a second predetermined threshold difference as the threshold difference when the target bitrate above the threshold bitrate. The second predetermined threshold difference may be less than the first predetermined threshold difference It should be understood that FIGS. 6, 7, 8, and 9 depict non-limiting embodiments. Thus, more or fewer steps than shown in FIGS. 6, 7, 8, and 9 may be used without departing from the scope of the embodiments herein. Additionally, some of these steps may be repeated one or more times, or may be omitted altogether. Further, the message flows and flow charts of the figures may be combined with one another and/or with other aspects described this specification and its accompanying drawings, in whole or in part, also without departing from the scope of the embodiments herein. For instance, any of the features discussed in the context of FIG. 6 may also be applied to methods illustrated by the flow chart of one or more of FIG. 7, 8, or 9.

In the drawings, a step or block that represents a processing of information may correspond to circuitry that can be configured to perform the specific logical functions of a herein-described method or technique. Alternatively or additionally, a step or block that represents a processing of information may correspond to a module, a segment, or a portion of program code (including related data). The program code may include one or more instructions executable by one or more processors for implementing specific logical functions or actions in the method or technique. The program code and/or related data may be stored on any type of computer-readable medium, such as a storage device, including a disk drive, a hard drive, or other storage media.

V. Conclusion

Example embodiments have been described above. Those skilled in the art will understand, however, that changes and modifications may be made to these embodiments herein without departing from the true scope and spirit of the invention, which is defined by the claims.

What is claimed is:

1. A method comprising:
   receiving, at a radio access network (RAN), a request to establish a call involving a wireless communication device (WCD) served by the RAN, wherein the WCD receives signals from the RAN via a plurality of wireless coverage areas at respective signal strengths, and wherein the plurality of wireless coverage areas are defined by the RAN;
   determining a codec to use for the call; and
   based on the determined codec, selecting a set of n wireless coverage areas through which the WCD and the RAN communicate during the call, wherein n is between 1 and a predetermined maximum number, and wherein the set of n wireless coverage areas is selected from the plurality of wireless coverage areas.

2. The method of claim 1, wherein selecting the set of n of wireless coverage areas through which the WCD and the RAN communicate during the call comprises:
   selecting two or more wireless coverage areas, wherein the WCD and the RAN communicating during the call involves the WCD and the RAN communicating substantially simultaneously via the two or more selected wireless coverage areas.

3. The method of claim 2, wherein the WCD and the RAN communicating substantially simultaneously via the two or more selected wireless coverage areas comprises:
   during establishment of the call, the RAN assigning, to the WCD, respective traffic channels from each of the two or more wireless coverage areas; and
   during an initial portion of the call, the RAN substantially simultaneously exchanging bearer traffic with the WCD via each of the assigned traffic channels.

4. The method of claim 3, wherein the RAN transmits and receives identical copies of the same bearer traffic via each of the assigned traffic channels.

5. The method of claim 2, wherein the WCD and the RAN communicating substantially simultaneously via the two or more selected wireless coverage areas comprises:
the substantially simultaneous communications traversing each of the two or more wireless coverage areas at approximately the same time.

6. The method of claim 2, wherein the WCD and the RAN communicating substantially simultaneously via the two or more selected wireless coverage areas comprises:
during establishment of the call, the RAN transmitting channel assignment messages to the WCD respectively via the two or more wireless coverage areas.

7. The method of claim 1, wherein n is based on bitrates supported by the determined codec.

8. The method of claim 1, wherein n is based on sampling frequencies supported by the determined codec.

9. The method of claim 1, wherein the predetermined maximum number of wireless coverage areas that can be used per call is based on the determined codec.

10. The method of claim 1, wherein the plurality of wireless coverage areas includes a primary wireless coverage area and one or more secondary wireless coverage areas, wherein the WCD receives signals via the primary wireless coverage area at a primary signal strength, and wherein the WCD receives signals via the one or more secondary wireless coverage areas at respective secondary signal strengths, wherein selecting the n wireless coverage areas through which the WCD and the RAN communicate during the call comprises:
determining respective differences between the primary signal strength and the respective secondary signal strengths; and
selecting (i) the primary wireless coverage area, and (ii) zero or more of the secondary wireless coverage areas for which the respective differences between the primary signal strength and the respective secondary signal strengths are less than a threshold difference.

11. An article of manufacture including a non-transitory computer-readable medium, having stored thereon program instructions that, upon execution by a computing device, cause the computing device to perform operations comprising:
receiving a request to establish a call involving a wireless communication device (WCD) served by a radio access network (RAN), wherein the WCD receives signals from the RAN via a plurality of wireless coverage areas at respective signal strengths, and wherein the plurality of wireless coverage areas are defined by the RAN;
determining a codec to use for the call; and
based on the determined codec, selecting a set of n wireless coverage areas through which the WCD and the RAN communicate during the call, wherein n is between 1 and a predetermined maximum number, and wherein the set of n wireless coverage areas is selected from the plurality of wireless coverage areas.

12. The article of manufacture of claim 11, wherein selecting the set of n of wireless coverage areas through which the WCD and the RAN communicate during the call comprises:
selecting two or more wireless coverage areas, wherein the WCD and the RAN communicating during the call involves the WCD and the RAN communicating substantially simultaneously via the two or more selected wireless coverage areas.

13. The article of manufacture of claim 12, wherein the WCD and the RAN communicating substantially simultaneously via the two or more selected wireless coverage areas comprises:
during establishment of the call, the RAN assigning, to the WCD, respective traffic channels from each of the two or more wireless coverage areas; and
during an initial portion of the call, the RAN substantially simultaneously exchanging bearer traffic with the WCD via each of the assigned traffic channels.

14. The article of manufacture of claim 13, wherein the RAN transmits and receives identical copies of the same bearer traffic via each of the assigned traffic channels.

15. The article of manufacture of claim 12, wherein the WCD and the RAN communicating substantially simultaneously via the two or more selected wireless coverage areas comprises:
the substantially simultaneous communications traversing each of the two or more wireless coverage areas at approximately the same time.

16. The article of manufacture of claim 12, wherein the WCD and the RAN communicating substantially simultaneously via the two or more selected wireless coverage areas comprises:
during establishment of the call, the RAN transmitting channel assignment messages to the WCD respectively via the two or more wireless coverage areas.

17. The article of manufacture of claim 11, wherein n is based on bitrates supported by the determined codec.

18. The article of manufacture of claim 11, wherein n is based on sampling frequencies supported by the determined codec.

19. The article of manufacture of claim 11, wherein the predetermined maximum number of wireless coverage areas that can be used per call is based on the determined codec.

20. The article of manufacture of claim 11, wherein the plurality of wireless coverage areas includes a primary wireless coverage area and one or more secondary wireless coverage areas, wherein the WCD receives signals via the primary wireless coverage area at a primary signal strength, and wherein the WCD receives signals via the one or more secondary wireless coverage areas at respective secondary signal strengths, wherein selecting the n wireless coverage areas through which the WCD and the RAN communicate during the call comprises:
determining respective differences between the primary signal strength and the respective secondary signal strengths; and
selecting (i) the primary wireless coverage area, and (ii) zero or more of the secondary wireless coverage areas for which the respective differences between the primary signal strength and the respective secondary signal strengths are less than a threshold difference.

* * * * *